Oscar Otto
Inventor
by James W. See
Attorney

Witnesses:
Elmer R. Shipley,
M. S. Belden.

and through the lower end of the hook and being adapted, when driven, to draw the hook forcibly toward the chuck-body.

UNITED STATES PATENT OFFICE.

OSCAR OTTO, OF MAYWOOD, ILLINOIS.

CHUCK.

999,248. Specification of Letters Patent. Patented Aug. 1, 1911.

Application filed December 26, 1907. Serial No. 408,184.

*To all whom it may concern:*

Be it known that I, OSCAR OTTO, a citizen of the United States, residing at Maywood, Cook county, Illinois, have invented certain new and useful Improvements in Chucks, of which the following is a specification.

There is a certain class of work to be bored, or turned, as exemplified in railway wheel tires, which, under the modern economical system of cutting at very high speed with tools of alloy steel, calls for extraordinary holding power on the part of the chucking device, along with facility for very rapid chucking. An ordinary radially acting chuck, if set up tight enough to grip the work with sufficient driving force, is quite liable to deform the work. My improvements in chucks for this class of work will be readily understood from the following description taken in connection with the accompanying drawing in which:—

Figure 1:
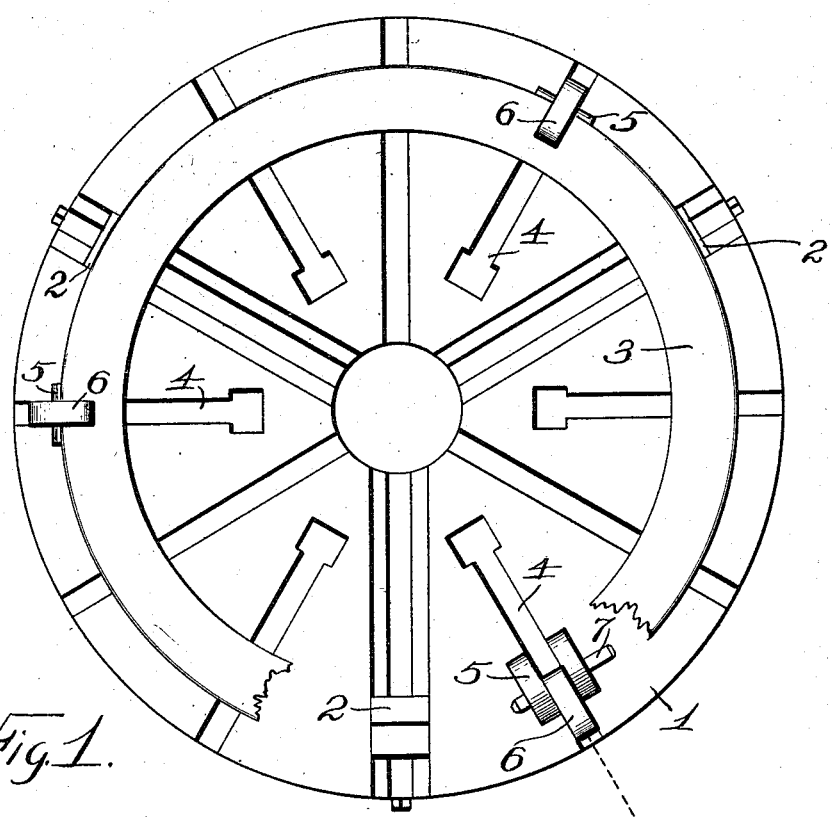
Figure 2:
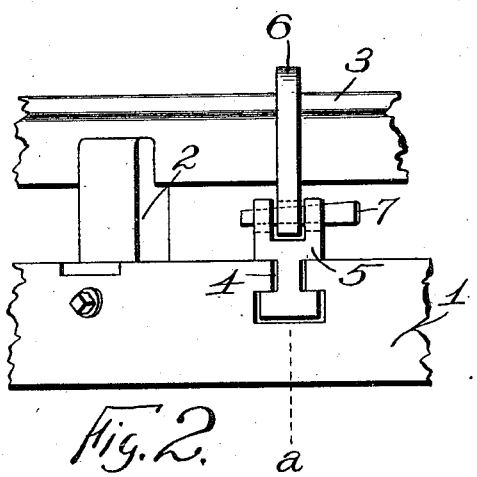
Figure 3:
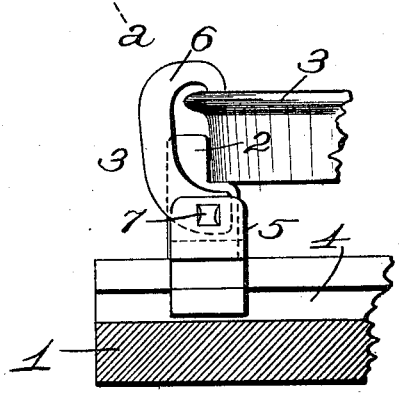

Figure 1 is a plan of a chuck embodying my invention: Fig. 2 an outer face view of one of the driving jaws: and Fig. 3 a side elevation of one of the driving jaws, the chuck-body appearing in vertical section in the plane of line *a* of Figs. 1 and 2.

In the drawing, illustrating the chuck in use for boring:—1, indicates an ordinary chuck-body: 2, ordinary chuck jaws movable radially and adapted to engage outside the work: 3, a typical piece of work held in the chuck, and shown as a tire for locomotive driving wheels: 4, tee-shaped radial slots in the face of the chuck-body: 5, a circumferential series of jaw-feet held in the slots 4, these jaw-feet being bifurcated at their upper ends: 6, a hook for each jaw-foot, the upper end of the hook engaging over the work, and the lower end of the hook engaging freely within the bifurcation of its appropriate jaw-foot: and 7, a wedge, one for each jaw-foot, the wedge passing through the bifurcation of the jaw and through the lower end of the hook and being adapted, when driven, to draw the hook forcibly toward the chuck-body.

The tire, or other piece of work, is first to be centered in the ordinary chuck-jaws 2. If the jaws be arranged for simultaneous movement, as is common in ordinary chucks, then this centering is done by simply closing all of the jaws upon the tire. If, on the other hand, the chuck-jaws are independent, then the centering of the tire may be done by moving a single one of the chuck-jaws to the tire, the other two chuck-jaws always remaining in fixed position. This is, of course, presuming that a number of tires of uniform exterior diameter are to be bored. It is not the duty of these ordinary chuck-jaws to grip the tire with sufficient force to drive it while the boring is being done but merely to center the tire, and consequently very little power need be exerted in closing these jaws upon the tire, a mere centering contact being sufficient. The tire having been centered, the hooks 6 are placed in position and the wedges 7 are to be driven. The result is that the tire is powerfully clamped toward the chuck-body, the driving grip of the chuck being gotten from the driving jaws formed by the hooks and jaw-feet. It is not essential that the wedges be driven with extreme tightness for if, when the boring first begins, the tire should slip in the chuck the effect would be to give a cant to the hooks and cause them to increase their grip upon the tire. In other words, these hooks are self-tightening. When the tire has been bored then the hooks are released by driving the wedges back and the hooks are withdrawn outwardly, either by removing them from the jaw-feet or by moving the hooks and jaw-feet outwardly together. The chuck-jaws are then released and the tire may be removed.

The shifting of the jaw-feet in the radial slots of the chuck-body provides for tires of various diameters, and it is manifest that if the chuck be intended to deal constantly with tires of substantially the same diameter, no radial shifting of the driving jaws need be provided for, the hooks being entirely released from the tire by having their upper ends displaced outwardly without displacing the jaw-feet.

For outside work, in place of boring, all the jaws and hooks engage inside instead of outside the tire.

I claim:—

1. A device of the class described embracing a bed, a supporting block of uniform height, a yoke engaged on the bed and having vertically slotted apertures extending through the arms thereof, a dog fitting at its lower end between the yoke arms and complementally apertured and at its upper end adapted to engage over the article to be engaged by the chuck and a tapered drift pin adapted to be driven through the apertures in said yoke arms and a dog to draw the dog downwardly thereby coacting with said supporting blocks.

2. In a device of the class described a bed provided with a groove a supporting block having a central rib on the lower end thereof adapted to engage in the groove in the bed and its upper end being adapted to engage an article to be supported thereon, an adjustable dog positively connected to the bed and adapted to engage the article above said supporting block and a key acting to draw the dog downwardly.

OSCAR OTTO.

Witnesses:
W. L. BUNTON,
GEO. R. SEAVERT.

Copies of this patent may be obtained for five cents each, by addressing the "Commissioner of Patents, Washington, D. C."